O. A. STROMWALL.
COMBINATION MILKING STOOL AND PAIL HOLDER.
APPLICATION FILED JUNE 26, 1919.

1,333,643.

Patented Mar. 16, 1920.

Inventor:
Oscar A. Stromwall,
by: John E. Stryker
Attorney.

O. A. STROMWALL.
COMBINATION MILKING STOOL AND PAIL HOLDER.
APPLICATION FILED JUNE 26, 1919.
1,333,643.
Patented Mar. 16, 1920.
2 SHEETS—SHEET 2.
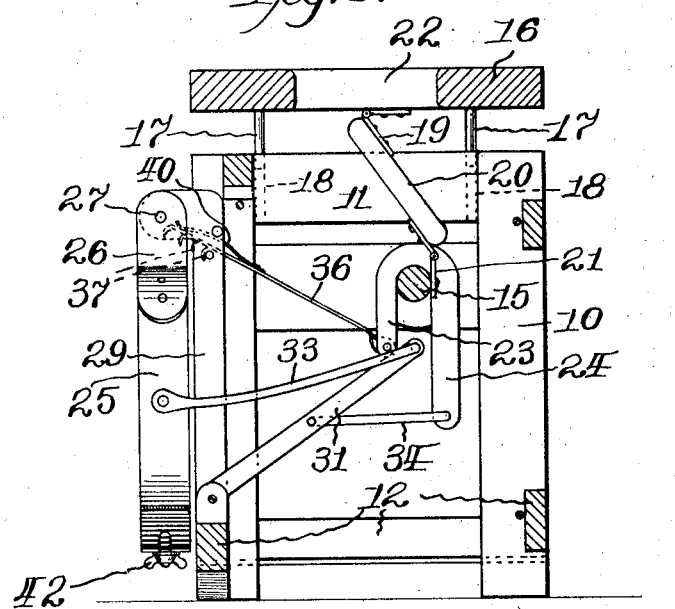
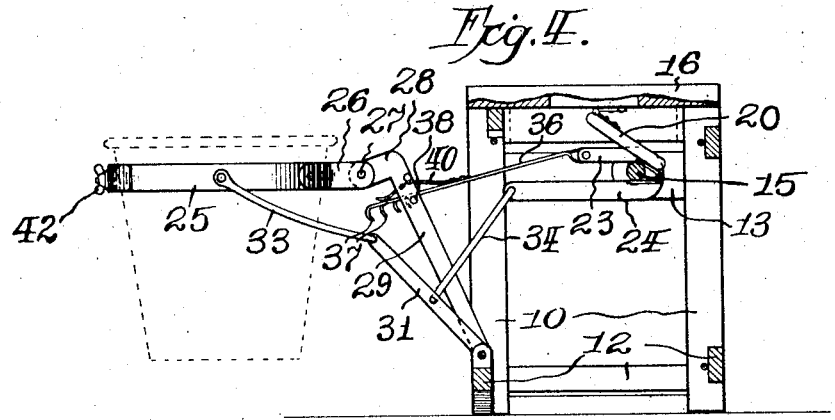
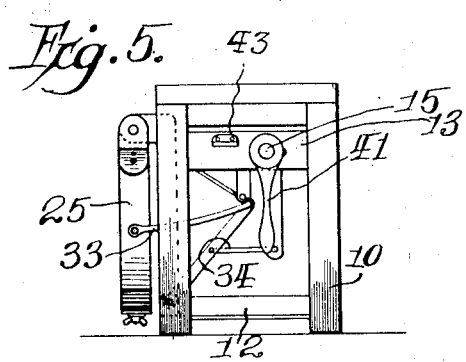
Inventor:
Oscar A. Stromwall,
by John E. Shyker
Attorney.

UNITED STATES PATENT OFFICE.

OSCAR A. STROMWALL, OF FORESTON, MINNESOTA.

COMBINATION MILKING-STOOL AND PAIL-HOLDER.

1,333,643.　　　　　Specification of Letters Patent.　　Patented Mar. 16, 1920.

Application filed June 26, 1919. Serial No. 306,945.

*To all whom it may concern:*

Be it known that I, OSCAR A. STROMWALL, a citizen of the United States, residing at Foreston, in the county of Millelacs and State of Minnesota, have invented new and useful Combination Milking-Stool and Pail-Holder, of which the following is a specification.

My invention relates to a combined milking stool and pail holder.

Its object is to produce a seat and pail support which may be quickly adjusted for milking and removal from milking position.

A further object is to provide such a device with automatic means for extending the pail holder beneath the animal to be milked.

A further object is to provide such a device with adjustable means to adapt it for use with cows having low or high udders.

In the drawings Figure I is a perspective view of my device with the pail support retracted. Fig. II is a perspective view of the same with the pail support extended in milking position. Fig. III is a side view partly in section with the pail holder in retracted position. Fig. IV is a side view also partly in section with the pail holder in extended position and showing the pail in dotted lines. Fig. V is an elevation showing a modified construction of the seat.

The frame of the milking stool comprises legs 10 securely united by means of horizontal braces 11 and 12. Supports 13 rigidly fixed in the sides of the frame between the legs 10 provide bearings 14 for the transverse shaft 15, the purpose of which is hereinafter more fully described. The seat 16 is connected with the stool by means of the slide rods 17, the upper ends of which are fixed in the seat while the lower portions thereof are slidably mounted in vertical perforations 18 formed in the braces 11. On the lower side of the seat 16 I fasten, by means of hinges 19, a connecting bar 20 which at its lower end is articulated by means of the hinge 21 to the shaft 15. It will thus be seen that pressure on the seat 16 will cause a depression of the rods 17 in the braces 11, and a lowering of the bar 20 which will turn the shaft 15 a part revolution; and when the stool is lifted by means of the hand-hole 22 and the seat 16 elevated the shaft 15 turns back to its original position.

Arms 23 and 24 are rigidly attached to the center of the shaft 15 and move in a vertical arc at each turn of the shaft 15.

The pail ring 25 is provided with a pair of rearwardly extending flanges 26, which are pivotally connected by the pintle 27 with corresponding flanges 28 formed on the upper end of the tilting standard 29. This standard is pivotally connected at its lower end upon the rod 30 with the base of the frame of the milk stool. Side standards 31 are also tiltably mounted at their lower ends upon said rod 30 and at their upper ends are formed with eyes 32 in which are pivoted the ends of the links 33, and the outer extremeties of these links are pivoted to the sides of the pail ring 25. A bail 34 forms the connection between the arm 24 and the side standards 31, said bail having its ends pivoted in said side standards 31 near their center, and its central loop journaled in the outer end of said arm 24. A slot 35 is formed in the outer end of the arm 23 and in this slot is pivoted the inner end of a link 36 whose outer end extends through the opening 39 formed near the upper end of the tilting standard 29, said outer end of the link 36 being provided with a series of hooks 37 adapted to adjustably engage a pin 38 which is mounted transversely in said opening 39. A spring 40, arranged in the top of the opening 39 and attached to the standard 29, tends to press the hooks 37 into engagement with the pin 38, and, by manually adjusting against the pressure of said spring one or another of said hooks 37 upon said pin 38, a greater or less inclination may be imparted to the standard 29 and thereby the pail ring 25 may be adjusted higher or lower so as to accommodate the varying heights of the udders of different cows.

The pail support 25 is preferably a split ring of spring metal having its ends arranged to overlap and provided with registering slots and a lock nut 42 so that the ring may be quickly expanded or contracted and locked to fit pails of varying diameters.

In operation a stool when in the positions shown in Figs. I and III is placed beside a cow to be milked, and when the milker seats himself the slide rods 17 descend and the connecting bar 20 is depressed, thereby turning the shaft 15 and moving the arms 23 and 24 from the position shown in Figs.

I and III to that shown in Figs. II and IV. The movement of these arms actuates the standards and links above described, thus extending the pail support beneath the cow to be milked, and when the stool is lifted by means of the hand-hole 22 the holder is again retracted to the position shown in Figs. I and III.

In the modified construction shown in Fig. V the seat 16 is rigidly attached to the frame of the stool and a crank handle 41 is provided on the end of the shaft 15 by which said shaft is manually turned, while a stop 43, against which said handle impinges when elevated, prevents turning the shaft 15 to move the tilting standards beyond predetermined extended position; otherwise the arrangement and operation of the arms 23 and 24, as well as the connecting mechanism with the pail holder 25, is identical with that of the preferred construction, it being obvious that turning said crank actuates all the intermediate mechanism in the same way as the depression of the seat in the preferred construction.

Having described my invention what I claim as new and desire to protect by Letters Patent is:

1. In a device of the class described a stool having a shaft rotatably mounted in the frame thereof, arms tangentially fixed on said shaft, tiltable standards pivotally mounted at their lower ends in the base of said stool, links connecting said arms to said standards, a pail ring pivotally supported upon the upper extremities of said standards and means for turning said shaft to tilt said standards.

2. In a device of the class described a stool having a shaft rotatably mounted in the frame thereof, arms tangentially fixed on said shaft, tiltable standards pivotally mounted at their lower ends in the base of said stool, means connecting said arms to said standards, a pail ring, means connecting said ring with the upper extremities of said standards and means for turning said shaft to tilt said standards.

3. In a device of the class described a stool having a shaft rotatably mounted in the frame thereof, arms tangentially fixed on said shaft, tiltable standards pivotally mounted at their lower ends in the base of said stool, flexible links connecting said arms to said standards, a split ring adapted to hold a milk pail pivotally supported upon the upper extremities of said standards, means for adjusting the inclination of said pail ring and means for turning said shaft to tilt said standards.

4. In a device of the class described a stool having a shaft rotatably mounted in the frame thereof, arms tangentially fixed on said shaft, tiltable standards pivotally mounted at their lower ends in the base of said stool, means connecting said arms to said standards, including a link having a series of spring pressed hooks on its outer end adapted to engage one of said standards and regulate its inclination when in tilted position, a pail ring flexibly supported on the upper extremities of said standards, and means for turning said shaft to tilt said standards.

5. In a device of the class described a stool having a shaft rotatably mounted in the frame thereof, arms tangentially fixed on said shaft, tiltable standards pivotally mounted at their lower ends in the base of said stool, links connecting said arms to said standards, a pail ring, flexible supports connected at three points on the periphery of said ring and severally pivoted to said standards respectively.

6. In a device of the class described a stool having a seat provided with slide rods mounted to move vertically, a shaft rotatably mounted in the frame of the stool, hinged bars connecting the seat with said shaft, arms tangentially fixed on said shaft, tiltable standards pivotally mounted at their lower ends in the base of said stool, means connecting said arms to said standards, a pail ring, and means connecting said ring with the upper extremities of said standards whereby the movement of the seat will turn said shaft to tilt said standards.

7. In a device of the class described a stool having a shaft rotatably mounted in the frame thereof, tiltable standards pivotally mounted at their lower ends in the base of said stool, reciprocating means connecting said shaft to said standards, a pail-holder pivotally supported upon the upper extremities of said standards and means for turning said shaft to tilt said standards.

OSCAR A. STROMWALL.